April 28, 1925.

E. AMBORN

POULTRY FEEDER

Filed July 8, 1924

Elmer Amborn
INVENTOR

BY Victor J. Evans
ATTORNEY

WITNESS: A. E. Wise.

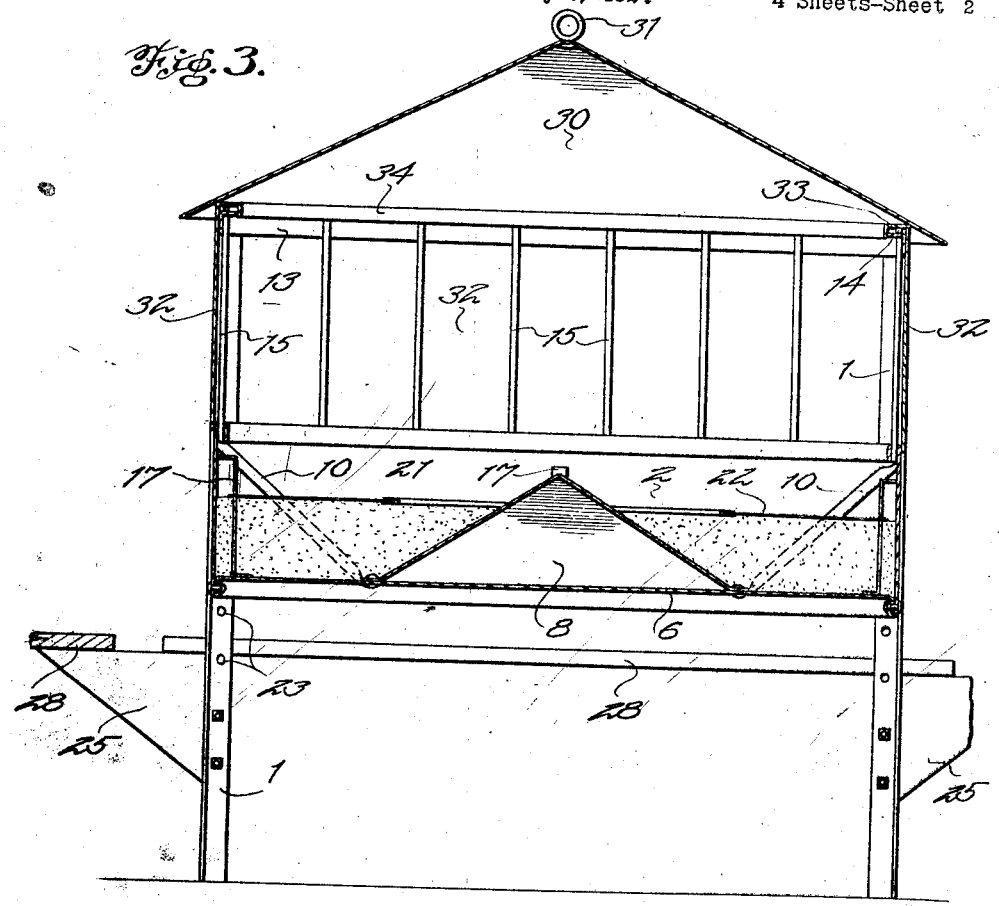
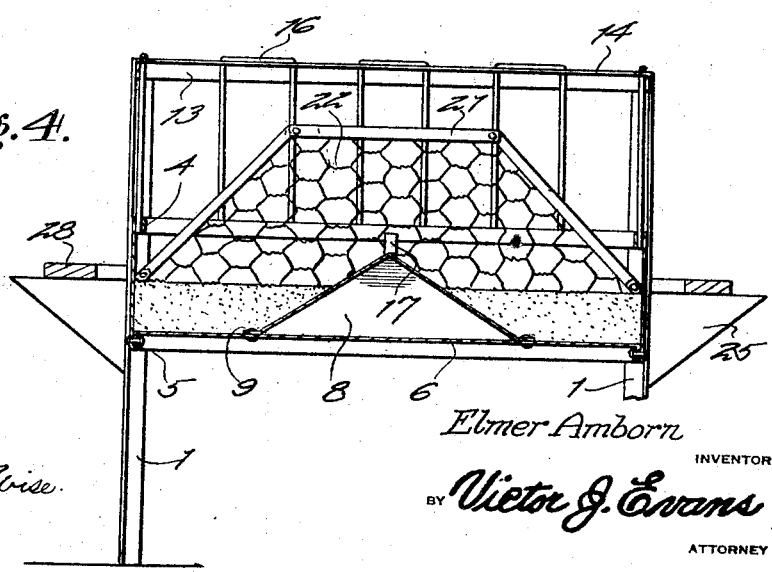

April 28, 1925.
E. AMBORN
POULTRY FEEDER
Filed July 8, 1924
1,535,890
4 Sheets-Sheet 3
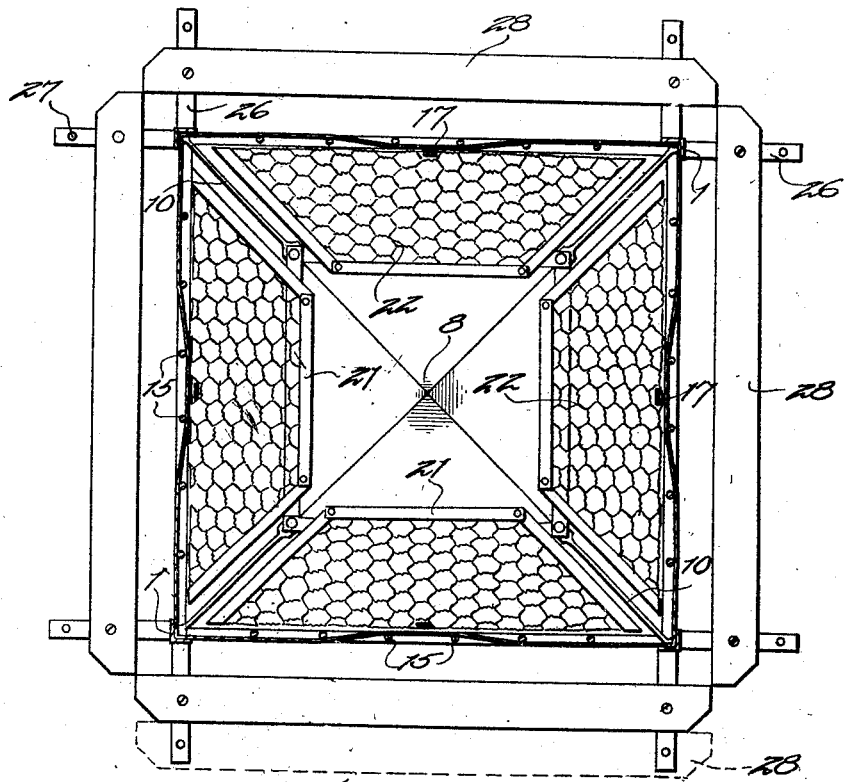
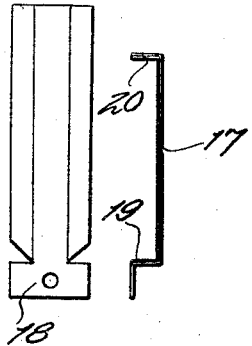
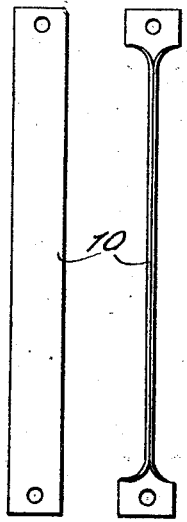
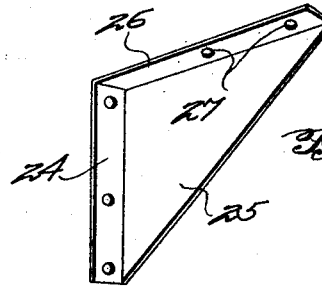
Elmer Amborn
INVENTOR
BY Victor J. Evans
ATTORNEY
WITNESS: R. E. Wise.

April 28, 1925.
E. AMBORN
POULTRY FEEDER
Filed July 8, 1924
1,535,890
4 Sheets-Sheet 4
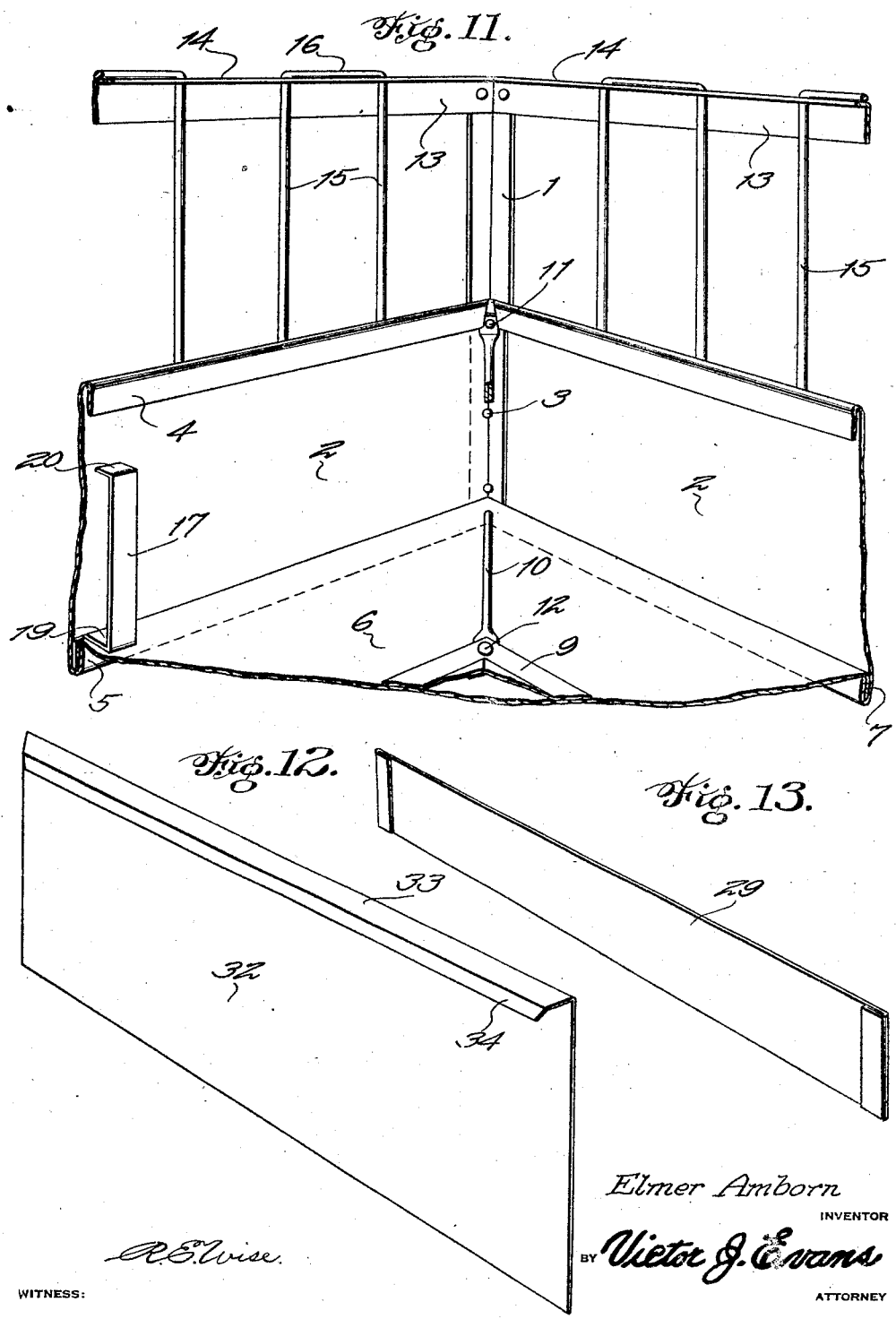

Patented Apr. 28, 1925.

1,535,890

UNITED STATES PATENT OFFICE.

ELMER AMBORN, OF BANGOR, WISCONSIN.

POULTRY FEEDER.

Application filed July 8, 1924. Serial No. 724,849.

*To all whom it may concern:*

Be it known that I, ELMER AMBORN, a citizen of the United States, residing at Bangor, in the county of La Crosse and State of Wisconsin, have invented new and useful Improvements in Poultry Feeders, of which the following is a specification.

My present invention has reference to a poultry feeder.

In carrying out my invention, it is my purpose to produce a poultry feeder adaptable for both grown and partly grown fowls, and which is of such construction as to prevent the fowls scattering and wasting the feed.

It is also my aim to produce a poultry feeder comprising a body having a bottom whose center is of frusto-pyramidal formation whereby feed will be directed thereover toward the sides of the body, the feed being covered by reticulated plates, and arranged above the body are spaced bars whereby grown fowls may project their heads to obtain the feed through the wire mesh or guards without danger of scattering and wasting the same, suitable adjustable platforms being provided exteriorly of the body and upon which the fowls rest, the said platforms being adjustable for fully grown or partly grown fowls, and when adjusted for the reception of the latter, a plate is woven through the bars to prevent fully grown fowls projecting their heads therebetween, the device being normally closed by a cover that also provides a water shed, while means is further provided for closing the device to prevent the destruction of the feed by rodents or the like.

With the above broadly stated objects in view, and others which will appear as the nature of the invention is better understood, reference is to be had to the drawings which accompany and which form part of this application.

In the drawings:—

Figure 3 is an approximately central longitudinal sectional view through the improvement.

Figure 4 is a fragmentary longitudinal sectional view showing one of the reticulated guards raised to vertical position and the cover removed for the replenishing of the food supply.

Figure 5 is a sectional view approximately on the line 5—5 of Figure 2.

Figure 6 is a plan view of the metal blank from which the guides for the reticulated protector plates are formed.

Figure 7 is a side elevation of the guide.

Figure 8 is a view of the blank from which one of the corner braces is formed.

Figure 9 is an elevation of the corner brace.

Figure 10 is a perspective view of one of the adjustable brackets on which the platforms are supported.

Figure 11 is a fragmentary perspective view looking toward one corner of the improvement.

Figure 12 is a perspective view of one of the cover plates which prevent the entrance of rodents or other destructive animals or insects to the feed in the improvement when not required for use by the poultry.

Figure 13 is a similar view of one of the slats which regulate the opening between the feed containing body and the bars extending upwardly therefrom for preventing the passage of the heads of growing fowls through the bars.

Figure 1:
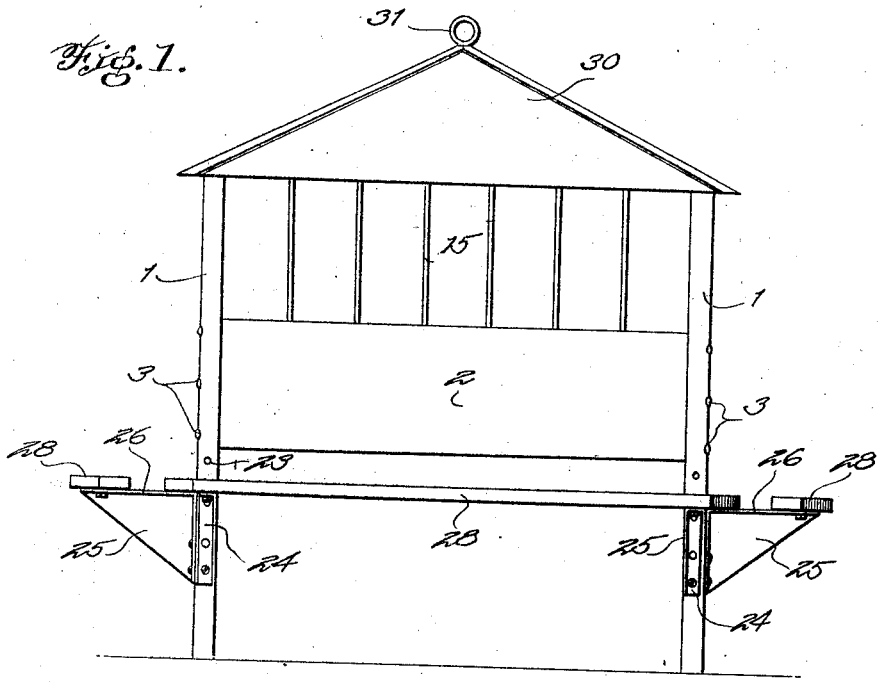
Figure 1 is a side elevation of the improvement.

My improved poultry feeder is preferably wholly constructed of metal, although the platform boards may be of wood.

As disclosed by the drawings, I make use of a frame whose corner posts 1 are formed of angle irons. On the posts 1, at a suitable distance above the lower ends thereof, I secure the body which comprises the feed holder of the improvement. The body is made up of side and end plates 2 having their ends flanged in opposite directions and the said flanges in contacting engagement with each other. The flanges are connected together and are likewise connected to the posts by rivets 3. The plates 2 of the body have both their upper and lower edges bent inwardly and extended to provide lips 4 and 5 respectively. The base 6 rests on the lower lips 5 and has its edges flanged, as at 7, and the said flanges are received in the lips 5. The base 6, at the center thereof, has secured thereon a frusto-pyramidal member 8, the sides of which being parallel with the sides and ends of the body. The improvement is preferably square in plan, and the frusto-conical projection 8 on the center of the base has its edges formed with an outstanding flange 9. Between the corner posts and the corners provided by the flange 9 of the member 8 there are secured angle brace rods 10. Preferably the brace rods have their upper ends arranged between the confronting ends of the upper lips 4 of the body so that a rivet or the like securing element 11 will pass therethrough and pass through the lapping flanged ends of the body. Another rivet 12 passes through the corners of the flange 9 and through the base 6 of the body. In this manner it will be noted that the base 6 is effectively supported on the body.

The portions of the corner posts extending below the body provide the supporting legs of the improvement the said posts, however, extending a suitable distance above the body. The upper ends of the said posts are connected together, by angle plates 13, the upper flanges of which being extended inwardly. The horizontal flanges of the plates 13 are indicated for distinction by the numeral 14 and the same are provided with equi-distantly spaced pairs of openings through which are passed the parallel arms 15 of substantially U-shaped wire members or arms, the connecting element 16 for the said arms 15 resting on the flange 14, the arms 15 passing through the lips 4 of the body and secured therein in any desired or preferred manner. The spaced rods 15 provide therebetween openings for the heads of the fowls to obtain access to the feed in the body.

On the inner faces of the members 2 of the body there are substantially U-shaped guides, broadly indicated by the numeral 17. The construction of these guides is disclosed in detail in Figures 6 and 7, and by reference to these figures, it will be seen that a single sheet of metal is employed, the said sheet adjacent to one of its ends being formed with substantially V-shaped slits and with longitudinal fold lines at the terminal of the slits. The sheet is folded on the fold lines so that the body is of a double thickness. The base of the guide is indicated for distinction by the numeral 18, the said strip being bent angularly thereof and from thence at a second angle opposite to the base, the last mentioned portion having its end further bent in a plane with and in the direction of the first mentioned bent portion, indicated by the numeral 19. The second or outer bent portion 20 is designed for contacting engagement with the inner walls of the body, the lower flange 19 resting on the base 6 of the said body, while the base 18 of each of the guides is received between the flanged end 7 of the base 6 and the lip 5 of the body plates. A suitable rivet connects the base 18 to the flange 7 and to the lip 8. Preferably the upper flange 20 is free from connection with the body so that the reticulated or mesh guards hereinafter to be described may be removed from the device for cleaning. This is an absolute necessity and therefore the end 20 of the guides 17 may be secured to the walls of the body.

The guards for the feed each comprises a frame having its longitudinal elements parallel and its ends arranged at opposite angles so that the inner end of each of the frames 21 is shorter than the outer member of the said frame. The frames are preferably in the nature of U-shaped metal members and have riveted or otherwise secured therebetween a wire mesh 22. It is, of course, to be understood that I am not to be restricted to this precise construction of guards as I may employ reticulated members of different construction to that just described. The outer members of the guard frames are received in the guides 17, the inner members 21 of which being disposed over but not in contact with the frusto-pyramidal member 8 on the base 6.

By reference to Figure 4 of the drawings, it will be noted that the guard may be swung to a vertical position on the guide 17, which permits of the operator placing the feed in the bottom of the body. Thereafter the guard is permitted to assume a horizontal position and as the feed is used by the poultry the guard will gravitate thereon. The mesh of the guard is such as to prevent the poultry scattering the feed. Bulky feed, like potatoes, ear corn, beets, etc., may be arranged on the top of the guards. When arranged in horizontal position the guards need no further attention.

Figure 2:
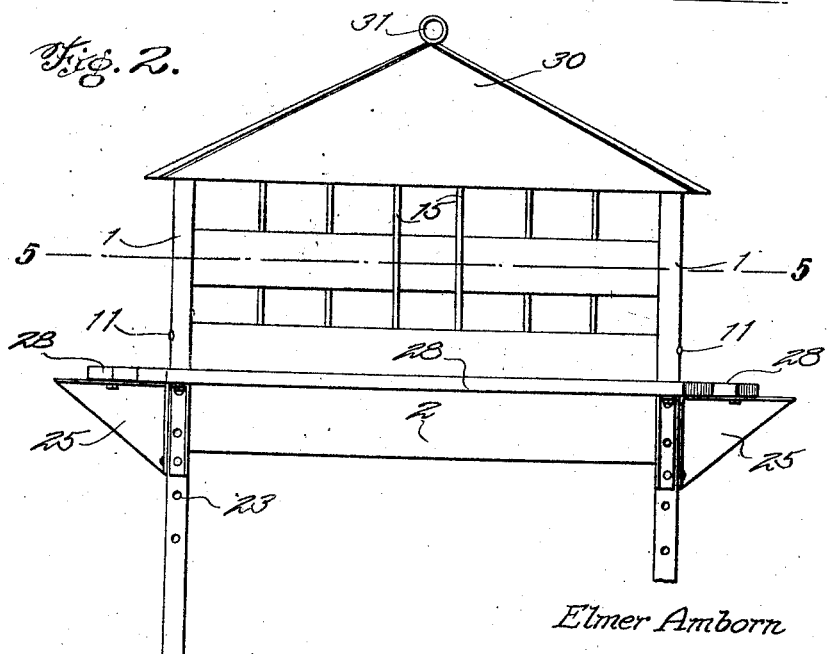
Figure 2 is a similar view but showing the feeder arranged to accommodate young poultry.

The lower or leg portions of the corner posts have their sides provided with series of apertures 23 through which are passed removable securing means, preferably in the nature of nuts and bolts that also pass through openings in the inner flange 24 of bracket members 25. The upper horizontal flanges 26 of the brackets are likewise provided with spaced openings 27. On the said horizontal flanges of the brackets there are adjustably secured boards or plates 28 that provide a platform. The platform is arranged entirely around the body, and when large fowls are to be fed, the platform is in the position illustrated in Figure 1. When smaller fowls or chicks are to be fed, the platform is arranged in the position illustrated in Figure 2. In this instance, I thread through the rods 15 plates or strips 29, illustrated in detail in Figure 13 of the drawings. These strips prevent small poultry crawling between the bars into the feeder, and may be adjusted to also prevent the heads of large fowls passing between the bars and the strips.

The platform plates or boards 28 are moved on the brackets 25 closer to the body than when larger fowls are fed, the said boards or plates 28 being secured to the brackets in both of the positions illustrated in Figures 3 and 4.

The top of the improvement is normally closed by a cover 30. The cover is in the nature of a peaked member, that is, the same is inclined downwardly from its center to its ends. The center or top of the cover is provided with an eye 31 that provides a hand hold whereby the cover may be arranged on or removed from the frame of the improvement.

In order to prevent rodents or other destructive animals or insects entering the feeder after the poultry has been fed, I employ four plates, such as the one disclosed in detail in Figure 12. These plates are indicated by the numeral 32 and are of a length and of a width to fully cover the bars 15 and to contact the sides and ends of the body. The upper edges of the plates 32 are flanged inwardly, as at 33 and from thence downwardly, as at 34. The flange 33 is arranged over the horizontal flange 14 of the angle plates secured to the upper ends of the posts and the downturned flange 34 contacts with the inner edges of the said flanges 14. In this manner the plates 32 are removably and swingably connected to the frame of the improvement. In some instances, it may be found desirable to allow the plates 32 to remain on the frame and in such instance, it is merely necessary that suitable means be employed for holding the plates at an outward angle with respect to the frame or in a line with the downwardly inclined walls of the cover 13.

With such arrangement, the poultry on the platforms will be protected from weather, although the slanting roof 30 may be extended for this purpose.

From the foregoing description, when taken in connection with the drawings, it will be noted that I have produced a comparatively simple construction of poultry feeders in which the feed is not only protected from scattering by the fowls but from rodents or the like, and in which the device may be employed with equal efficiency for growing or grown fowls. If the platforms are arranged too far above the ground for small poultry to perch thereupon, runways from the platforms may be provided, and it is believed that the foregoing description, when taken in connection with the drawings, will fully set forth the construction and its advantages, although I reserve the right to make such changes therefrom as fairly fall within the scope of what I claim.

Having described the invention, I claim:

1. A poultry feeder including a body which is substantially square in plan having an open top and its bottom centrally formed with a frusto-pyramidal member, guards of wire mesh arranged between the sides of the frusto-pyramidal member and the sides and ends of the body and designed to rest on the feed when placed in the body and to gravitate on said feed when the latter is diminished, and vertically disposed guides in the body providing guides for the guards and permitting the swinging of the guards against the body when the feed is to be replenished.

2. A poultry feeder including a box-like body having its base centrally provided with a frusto-pyramidal member, brace means between the corners of the body and the frusto-pyramidal member, reticulated guards in the body between the brace members, a vertically disposed substantially U-shaped guide for each guard, and said guards designed to rest on the feed in the body and to gravitate thereon as the feed is diminished.

3. A poultry feeder including a box-like body having its base centrally provided with a frusto-pyramidal member, brace means between the corners of the body and the frusto-pyramidal member, reticulated guards in the body between the brace members, a vertically disposed substantially U-shaped guide for each guard, said guards designed to rest on the feed in the body and to gravitate thereon as the feed is diminished, and spaced rods projecting above the body.

4. A poultry feeder including a box-like body having its base centrally provided with a frusto-pyramidal member, brace means between the corners of the body and the frusto-pyramidal member, reticulated guards in the body between the brace members, a vertically disposed substantially U-shaped guide for each guard, said guards designed to rest on the feed in the body and to gravitate thereon as the feed is diminished, spaced rods projecting above the body, and strips designed to be threaded between the bars, for the purpose set forth.

5. A poultry feeder including a box-like body having its base centrally provided with a frusto-pyramidal member, brace means between the corners of the body and the frusto-pyramidal member, reticulated guards in the body between the brace members, a vertically disposed substantially U-shaped guide for each guard, and said guards designed to rest on the feed in the body and to gravitate thereon as the feed is diminished, spaced bars projecting from the body, and platforms supported at the outer sides and ends of the body susceptible to vertical and lateral adjustment.

6. A poultry feeder including a box-like body having its base centrally provided with a frusto-pyramidal member, brace means between the corners of the body and the frusto-pyramidal member, reticulated guards in the body between the brace members, a vertically disposed substantially U-shaped guide for each guard, said guards designed to rest on the feed in the body and to gravitate thereon as the feed is diminished, corner posts supporting the body and extending above and below the same, angle plates connected to the upper ends of the corner posts, substantially U-shaped bars passing through the angle plates and connected to the upper edges of the body, vertically adjustable brackets secured on the sides of the corner posts, laterally adjustable platforms on the brackets, and a removable peaked cover for the feeder.

7. A poultry feeder including a box-like body having its base centrally provided with a frusto-pyramidal member, brace means between the corners of the body and the frusto-pyramidal member, reticulated guards in the body between the brace members, a vertically disposed substantially U-shaped guide for each guard, and said guards designed to rest on the feed in the body and to gravitate thereon as the feed is diminished, corner posts supporting the body and extending above and below the same, angle plates connected to the upper ends of the corner posts, substantially U-shaped bars passing through the angle plates and connected to the upper edges of the body, vertically adjustable brackets secured on the sides of the corner posts, laterally adjustable platforms on the brackets, removable plates having upper angle ends to rest on the angle connecting members of the posts for covering the rods, and a removable peaked cover for the feeder.

In testimony whereof I affix my signature.

ELMER AMBORN.